US012124197B2

United States Patent
(12) United States Patent
Yoshinaga et al.

(10) Patent No.: US 12,124,197 B2
(45) Date of Patent: Oct. 22, 2024

(54) HEATING DEVICE, FIXING DEVICE, AND IMAGE FORMING APPARATUS INCLUDING LUBRICANT AND REFLECTOR

(71) Applicants: Hiroshi Yoshinaga, Chiba (JP); Takayuki Andoh, Kanagawa (JP); Masahiro Samei, Kanagawa (JP); Kota Shiodera, Tokyo (JP); Toshiyuki Kabata, Kanagawa (JP)

(72) Inventors: Hiroshi Yoshinaga, Chiba (JP); Takayuki Andoh, Kanagawa (JP); Masahiro Samei, Kanagawa (JP); Kota Shiodera, Tokyo (JP); Toshiyuki Kabata, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 18/162,872

(22) Filed: Feb. 1, 2023

(65) Prior Publication Data

US 2023/0297015 A1 Sep. 21, 2023

(30) Foreign Application Priority Data

Mar. 17, 2022 (JP) ................................ 2022-042532
Nov. 21, 2022 (JP) ................................ 2022-185658

(51) Int. Cl.
*G03G 15/20* (2006.01)

(52) U.S. Cl.
CPC ..... *G03G 15/2053* (2013.01); *G03G 15/2007* (2013.01); *G03G 15/2017* (2013.01); *G03G 15/2025* (2013.01); *G03G 15/2057* (2013.01); *G03G 2215/20* (2013.01); *G03G 2215/2003* (2013.01); *G03G 2215/2025* (2013.01); *G03G 2215/2035* (2013.01); *G03G 2215/2048* (2013.01)

(58) Field of Classification Search
CPC ........... G03G 15/2007; G03G 15/2017; G03G 15/2053; G03G 15/2057; G03G 2215/20; G03G 2215/2003; G03G 2215/2025; G03G 2215/2035; G03G 2215/2048; G03G 15/2025
See application file for complete search history.

(56) References Cited

U.S. PATENT DOCUMENTS 9,405,239 B2 * 8/2016 Ikebuchi ............ G03G 15/2042
2007/0196152 A1 8/2007 Shimizu et al.
2011/0044734 A1 2/2011 Shimokawa et al.
2011/0052245 A1 3/2011 Shinshi et al.
(Continued)

FOREIGN PATENT DOCUMENTS

JP 2010-026058 A 2/2010
JP 2013-164453 A 8/2013

*Primary Examiner* — Joseph S Wong
(74) *Attorney, Agent, or Firm* — Harness, Dickey & Pierce, P.L.C.

(57) ABSTRACT

A heating device includes a rotator, a heating source, a rotator holder, and a liquid or semi-solid substance. The rotator is rotatably held. The heating source heats the rotator. The rotator holder holds a longitudinal end portion of the rotator. The rotator holder includes a reflector disposed at least at a portion to be irradiated with radiant heat emitted from the heating source to reflect the radiant heat. The reflector has a reflectance of not less than 60%. The liquid or semi-solid substance has lubricity and adheres to the rotator holder.

15 Claims, 11 Drawing Sheets

(56) References Cited

U.S. PATENT DOCUMENTS

| | | | | |
|---|---|---|---|---|
| 2011/0064437 | A1 | 3/2011 | Yamashina et al. | |
| 2011/0222875 | A1 | 9/2011 | Imada et al. | |
| 2011/0222888 | A1 | 9/2011 | Ikebuchi et al. | |
| 2011/0222931 | A1 | 9/2011 | Shinshi et al. | |
| 2011/0274453 | A1 | 11/2011 | Shimokawa et al. | |
| 2012/0177388 | A1 | 7/2012 | Imada et al. | |
| 2013/0045032 | A1 | 2/2013 | Shimokawa et al. | |
| 2013/0164056 | A1 | 6/2013 | Imada et al. | |
| 2013/0195523 | A1 | 8/2013 | Yamaji et al. | |
| 2013/0209147 | A1 | 8/2013 | Ogawa et al. | |
| 2014/0341627 | A1 | 11/2014 | Yoshikawa et al. | |
| 2017/0185015 | A1 | 6/2017 | Yoshinaga et al. | |
| 2018/0024462 | A1 | 1/2018 | Shimada et al. | |
| 2018/0267449 | A1 | 9/2018 | Naitoh et al. | |
| 2020/0050144 | A1 | 2/2020 | Kabata et al. | |
| 2020/0301328 | A1* | 9/2020 | Kabata ................. | G03G 15/206 |
| 2021/0364957 | A1* | 11/2021 | Saito .................. | G03G 15/2064 |
| 2022/0026834 | A1 | 1/2022 | Yoshinaga | |
| 2023/0297010 | A1* | 9/2023 | Inoue ................. | G03G 15/2025 399/330 |

* cited by examiner

HEATING DEVICE, FIXING DEVICE, AND IMAGE FORMING APPARATUS INCLUDING LUBRICANT AND REFLECTOR

CROSS-REFERENCE TO RELATED APPLICATIONS

This patent application is based on and claims priority pursuant to 35 U.S.C. § 119(a) to Japanese Patent Application Nos. 2022-042532, filed on Mar. 17, 2022, and 2022-185658, filed on Nov. 21, 2022, in the Japan Patent Office, the entire disclosure of each of which is hereby incorporated by reference herein.

BACKGROUND

Technical Field

Embodiments of the present disclosure relate to a heating device, a fixing device, and an image forming apparatus.

Related Art

As an example of a heating device included in an image forming apparatus such as a copier or a printer, a fixing device is known that heats a recording medium such as a sheet of paper and fixes an unfixed image onto the recording medium.

In such a fixing device, a substance having lubricity, which may be referred to as a lubricant in the following description, such as oil or grease is typically used to reduce sliding resistance generated between a rotator such as a belt and a component such as a nip formation pad or a belt holder over which the rotator slides. The substance having lubricity refers to a substance that is interposed between components to reduce frictional resistance between the components.

Environmental concerns are very high worldwide, especially in Europe. There are various authorization standards for volatile organic compounds (VOC), ozone, dust, and fine particles that are generated during image formation in electrophotographic image forming apparatuses such as copiers, printers, or multifunction peripherals. For example, the Blue Angel has been the ecolabel of the German Federal Government. Only certified products and services are permitted to use the label.

Although products that are not certified by the Blue Angel can be sold, such uncertified products are often regarded as environmentally unfriendly products. This tendency is particularly strong in government offices. In short, the Blue Angel certification has a significant impact on product sales.

The Blue Angel certification requires various tests to be cleared. In particular, tests for fine particles are very strict. Specifically, the number of fine particles of 5.6 nm to 560 nm that are generated from the image forming apparatus and measured by the FAST MOBILITY PARTICLE SIZER (FMPS) is required to be less than $3.5\times10^{11}/10$ minutes. A stricter reference value may be set in the future. The fine particles in this case are not distinguished by the kind or state of a substance forming the fine particles. For example, the fine particles are not distinguished by a nonorganic or organic substance, or by a solid or liquid (mist) substance. Only the size and number of the fine particles are relevant. Although fine particles may be generated from various components of the image forming apparatus, the fixing device is known as a main cause of the generation of fine particles since the amount of generated fine particles is greatly increased when the fixing device is activated alone.

Indeed, fine particles are detected when the lubricant is heated to a relatively high temperature. Thus, the lubricant is one of the sources of fine particles. When the lubricant is heated to a relatively high temperature, a few components of the lubricant may be volatilized as a high-temperature gas, which may be cooled and condensed to form fine particles. The generation of fine particles from the image forming apparatus is to be reduced by preventing the lubricant from being exposed to a high-temperature environment.

SUMMARY

According to an embodiment of the present disclosure, a novel heating device includes a rotator, a heating source, a rotator holder, and a liquid or semi-solid substance. The rotator is rotatably held. The heating source heats the rotator. The rotator holder holds a longitudinal end portion of the rotator. The rotator holder includes a reflector disposed at least at a portion to be irradiated with radiant heat emitted from the heating source to reflect the radiant heat. The reflector has a reflectance of not less than 60%. The liquid or semi-solid substance has lubricity and adheres to the rotator holder.

According to an embodiment of the present disclosure, a novel fixing device includes the heating device and a counter rotator. The heating device heats a recording medium bearing an unfixed image. The counter rotator faces an outer circumferential surface of the rotator of the heating device to fix the unfixed image onto the recording medium.

According to an embodiment of the present disclosure, a novel image forming apparatus includes the fixing device.

According to an embodiment of the present disclosure, a novel image forming apparatus includes the heating device.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
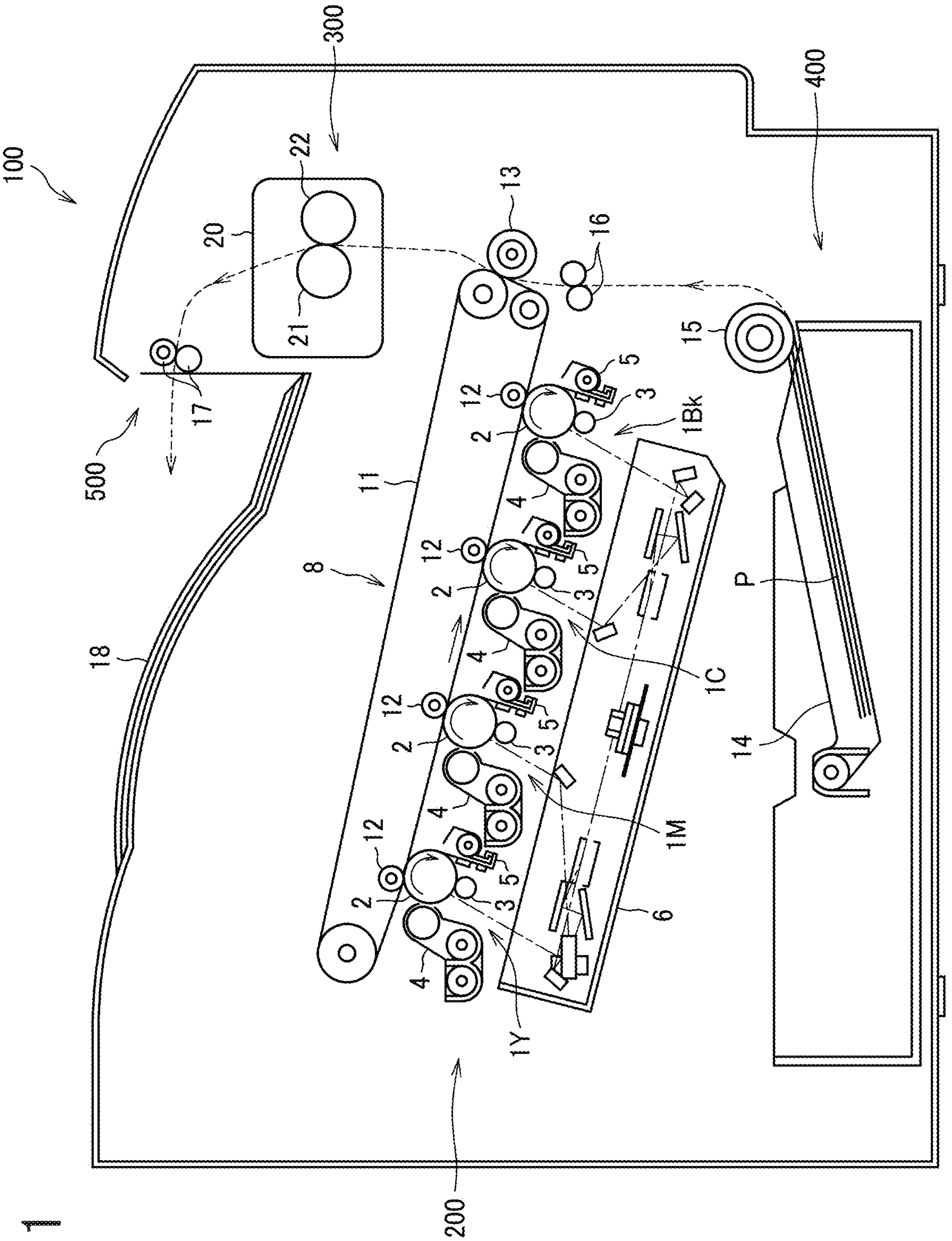
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

For the sake of simplicity, like reference numerals are given to identical or corresponding constituent elements such as parts and materials having the same functions, and redundant descriptions thereof are omitted unless otherwise required.

Note that, in the following description, suffixes Y, M, C, and Bk denote colors of yellow, magenta, cyan, and black, respectively. To simplify the description, these suffixes are omitted unless necessary.

As used herein, the term "connected/coupled" includes both direct connections and connections in which there are one or more intermediate connecting elements.

FIG. 1 is a schematic diagram illustrating a configuration of an image forming apparatus according to an embodiment of the present disclosure.

In the following description, the "image forming apparatus" may be a printer, a copier, a scanner, a facsimile machine, or a multifunction peripheral having at least two of printing, copying, scanning, and facsimile functions. "Image formation" means the formation of images with meanings such as characters and figures and the formation of images with no meanings such as patterns. Initially, with reference to FIG. 1, a description is given of the overall configuration and operation of an image forming apparatus 100 according to the present embodiment.

As illustrated in FIG. 1, the image forming apparatus 100 according to the present embodiment includes an image forming section 200, a fixing section 300, a recording-medium supplying section 400, and a recording-medium ejecting section 500. The image forming section 200 forms an image on a sheet-like recording medium such as a sheet of paper. The fixing section 300 fixes the image onto the recording medium. The recording-medium supplying section 400 supplies the recording medium to the image forming section 200. The recording-medium ejecting section 500 ejects the recording medium to the outside of the image forming apparatus 100.

The image forming section 200 includes four process units 1Y, 1M, 1C, and 1Bk as image forming units, an exposure device 6, and a transfer device 8. The exposure device 6 forms an electrostatic latent image on a photoconductor 2 included in each of the process units 1Y, 1M, 1C, and 1Bk. The transfer device 8 transfers an image onto the recording medium.

The process units 1Y, 1M, 1C, and 1Bk have identical configurations, except that the process units 1Y, 1M, 1C, and 1Bk contain toners as developers in different colors, namely, yellow (Y), magenta (M), cyan (C), and black (Bk) corresponding to color-separation components of a color image. Specifically, each of the process units 1Y, 1M, 1C, and 1Bk includes the photoconductor 2, a charger 3, a developing device 4, and a cleaner 5. The photoconductor 2 serves as an image bearer having a surface that bears an electrostatic latent image and a resultant toner image. The charger 3 charges the surface of the photoconductor 2. The developing device 4 supplies toner as a developer to the electrostatic toner image formed on the surface of the photoconductor 2, rendering the electrostatic latent image visible as a toner image. In short, the developing device 4 forms a toner image on the photoconductor 2. The cleaner 5 cleans the surface of the photoconductor 2.

The transfer device 8 includes an intermediate transfer belt 11, four primary transfer rollers 12, and a secondary transfer roller 13. The intermediate transfer belt 11 is an endless belt entrained around a plurality of support rollers. The four primary transfer rollers 12 are disposed inside a loop formed by the intermediate transfer belt 11. Each of the four primary transfer rollers 12 contacts the corresponding photoconductor 2 via the intermediate transfer belt 11 to form an area of contact, called a primary transfer nip, between the intermediate transfer belt 11 and the photoconductor 2. The secondary transfer roller 13 contacts an outer circumferential surface of the intermediate transfer belt 11 to form an area of contact, called a secondary transfer nip, between the secondary transfer roller 13 and the intermediate transfer belt 11.

The fixing section 300 includes a fixing device 20 as a heating device that heats the recording medium bearing the transferred image. The fixing device 20 includes a fixing belt 21 and a pressure roller 22. The fixing belt 21 heats the image on the recording medium. The pressure roller 22 contacts the fixing belt 21 to form an area of contact, called a fixing nip, between the fixing belt 21 and the pressure roller 22.

The recording-medium supplying section 400 includes an input tray 14 and a sheet feeding roller 15. Sheets P as recording media are stored on the input tray 14. The sheet feeding roller 15 feeds the sheets P one at a time from the input tray 14. Although the "recording medium" will be described as a "sheet" below, the "recording medium" is not limited to a sheet of paper. Examples of the "recording medium" include, but are not limited to, a sheet of paper, an overhead projector (OHP) transparency, fabric, a metal sheet, a plastic film, or a prepreg sheet obtained by impregnating carbon fibers with a resin in advance. The sheet of paper may be a sheet of plain paper, thick paper, thin paper, coated paper such as art paper, or tracing paper. Examples of the sheet of paper include, but are not limited to, a postcard and an envelope in addition to the aforementioned kinds of sheets of paper.

The recording-medium ejecting section 500 includes an output roller pair 17 and an output tray 18. The output roller pair 17 ejects or outputs the sheet P to the outside of the image forming apparatus 100. The sheet P that is ejected by the output roller pair 17 rests on the output tray 18.

To provide a fuller understanding of the embodiments of the present disclosure, a description is now given of the printing operation of the image forming apparatus 100 according to the present embodiment, with continued reference to FIG. 1.

As the image forming apparatus 100 starts the image forming operation, the photoconductor 2 of each of the process units 1Y, 1M, 1C, and 1Bk and the intermediate transfer belt 11 of the transfer device 8 start rotating. The sheet feeding roller 15 also starts rotating to feed the sheet P from the input tray 14. The fed sheet P comes into contact with a timing roller pair 16 and stops. Thus, the conveyance of the sheet P is temporarily stopped until an image to be transferred to the sheet P is formed.

In each of the process units 1Y, 1M, 1C, and 1Bk, the charger 3 uniformly charges the surface of the photoconductor 2 at a high electric potential. According to image information of a document read by a document reading device or print information instructed to print by a terminal, the exposure device 6 exposes the charged surface of each of the photoconductors 2. As a result, the electric potential at an exposed portion on the surface of each of the photoconductors 2 is decreased. Thus, an electrostatic latent image is formed on the surface of each of the photoconductors 2. The developing device 4 supplies toner to the electrostatic latent image, rendering the electrostatic latent image visible as a toner image. Thus, a toner image is formed on the surface of each of the photoconductors 2. As the photoconductor 2 rotates, the toner image that is thus formed on the photoconductor 2 reaches the primary transfer nip defined by the primary transfer roller 12. At the primary transfer nip, the toner image is transferred onto the intermediate transfer belt 11 rotating. Specifically, the toner images are sequentially transferred from the respective photoconductors 2 onto the intermediate transfer belt 11 such that the toner images are superimposed one atop another, as a composite full-color toner image on the intermediate transfer belt 11. Thus, a full-color toner image is formed on the intermediate transfer belt 11. Any one of the process units 1Y, 1M, 1C, and 1Bk may be used to form a monochrome image. Alternatively, any two or three of the process units 1Y, 1M, 1C, and 1Bk may be used to form a bicolor image or tricolor image, respectively. After the toner image is transferred onto the intermediate transfer belt 11, the cleaner 5 removes residual toner from the photoconductor 2. The residual toner refers to toner that has failed to be transferred onto the intermediate transfer belt 11 and therefore remains on the surface of the photoconductor 2.

As the intermediate transfer belt 11 rotates, the full-color toner image on the intermediate transfer belt 11 is conveyed to the secondary transfer nip defined by the secondary transfer roller 13. At the secondary transfer nip, the full-color toner image is transferred onto the sheet P conveyed by the timing roller pair 16. The sheet P bearing the full-color toner image is conveyed to the fixing device 20. In the fixing device 20, the fixing belt 21 and the pressure roller 22 apply heat and pressure to the toner image on the sheet P to fix the toner image onto the sheet P. Then, the sheet P bearing the fixed toner image is conveyed to the recording-medium ejecting section 500. In the recording-medium ejecting section 500, the output roller pair 17 ejects the sheet P onto the output tray 18. Thus, a series of printing operations is completed.

Figure 2:
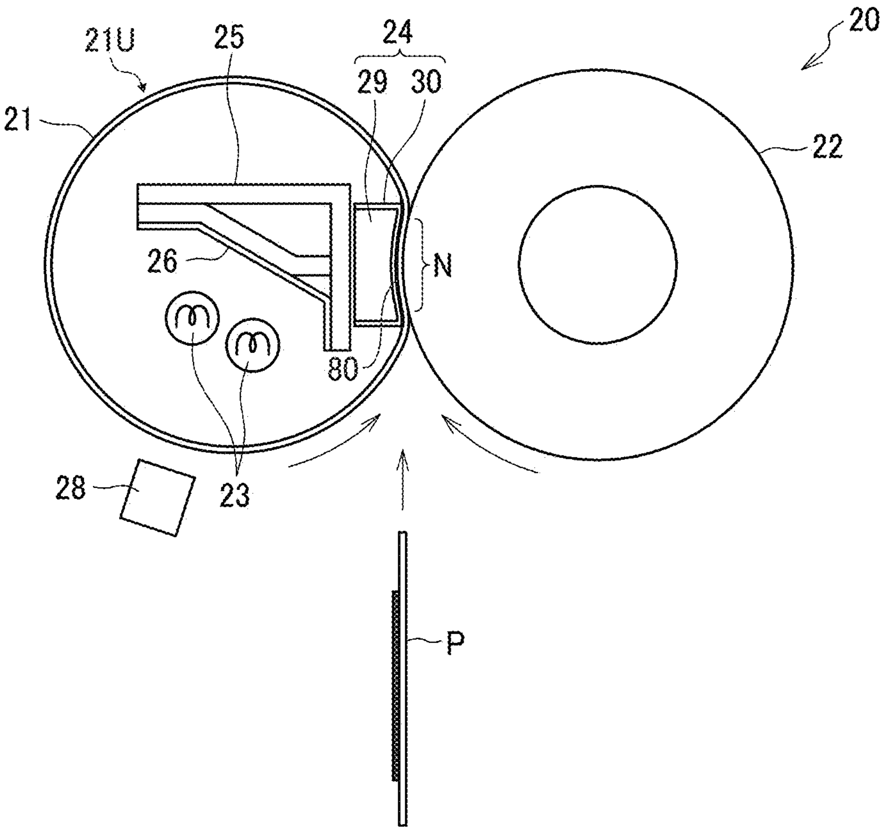
FIG. 2 is a cross-sectional view of a central portion of a fixing device included in the image forming apparatus of FIG. 1.
Figure 3:
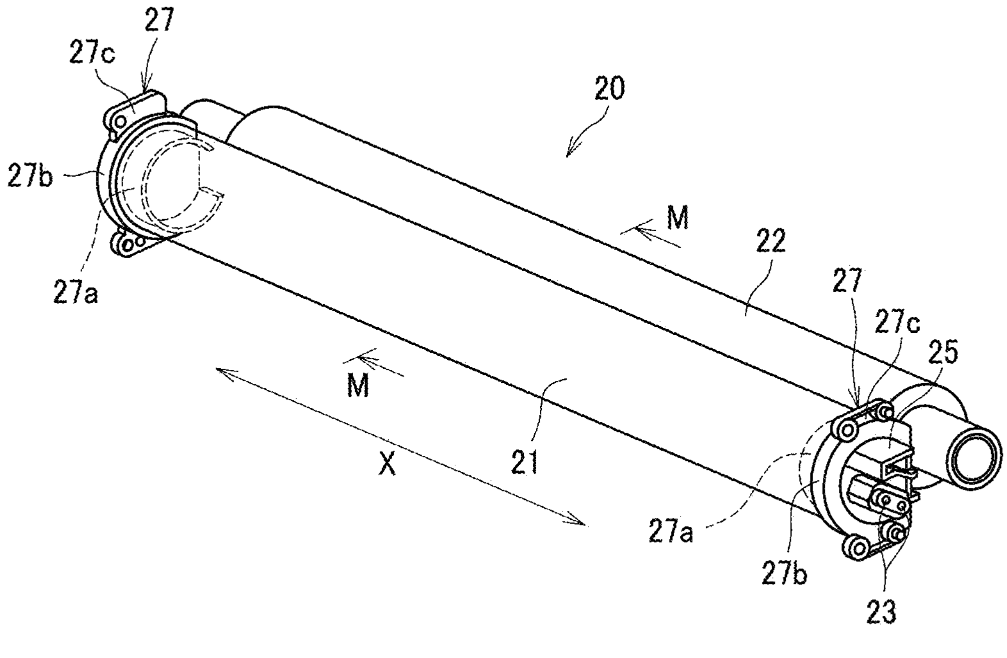
FIG. 3 is a perspective view of the fixing device of FIG. 2.

Referring now to FIGS. 2 and 3, a description is given of a basic configuration of the fixing device 20 according to the present embodiment.

FIG. 2 is a cross-sectional view of a central portion of the fixing device 20, taken at a longitudinal center portion M of the fixing belt 21 illustrated in FIG. 3.

FIG. 3 is a perspective view of the fixing device 20.

The above-described “longitudinal direction” of the fixing belt 21 is a direction indicated by two-headed arrow X in FIG. 3, along an axial direction of the pressure roller 22 or a width direction of the sheet P passing through the fixing nip between the fixing belt 21 and the pressure roller 22. The width direction of the sheet P is a direction intersecting a sheet conveyance direction in which the sheet P is conveyed. In the following direction, the longitudinal direction of the fixing belt 21 may be referred to as a longitudinal direction X. “Longitudinal direction” in the following description also has the same meaning.

As illustrated in FIGS. 2 and 3, the fixing device 20 according to the present embodiment includes heaters 23, a nip formation pad 24, a stay 25, a reflector 26 (see FIG. 2), belt holders 27 (see FIG. 3), and a temperature sensor 28 (see FIG. 2), in addition to the fixing belt 21 and the pressure roller 22 described above. The fixing belt 21 and the components disposed inside a loop formed by the fixing belt 21 constitute a belt unit 21U, which is detachably coupled to the pressure roller 22.

The fixing belt 21 is a rotator (specifically, a first rotator or a fixing rotator) that contacts an unfixed-toner bearing face of the sheet P bearing the unfixed toner to fix the unfixed toner or unfixed image onto the sheet P.

Specifically, the fixing belt 21 is an endless belt constructed of a base, an elastic layer, and a release layer laminated in this order from an inner circumferential surface to an outer circumferential surface of the fixing belt 21. The base has a thickness of 30 μm to 50 μm and is made of a metal material such as nickel or stainless steel or a resin material such as polyimide. The elastic layer has a thickness of 100 μm to 300 μm and is made of a rubber material such as silicone rubber, silicone rubber form, or fluorine rubber. The elastic layer of the fixing belt 21 eliminates slight surface asperities of the fixing belt 21 at the fixing nip, thus facilitating uniform conduction of heat to the toner image on the sheet P. The release layer of the fixing belt 21 has a thickness of 10 μm to 50 μm and is made of, for example, tetrafluoroethylene-perfluoroalkylvinylether copolymer (PFA), polytetrafluoroethylene (PTFE), polyimide, polyetherimide, or polyether sulfide (PES). The release layer of the fixing belt 21 facilitates the separation of toner contained in the toner image on the sheet P from the fixing belt 21. In other words, the release layer of the fixing belt 21 facilitates the release of the toner from the fixing belt 21. To reduce the size and thermal capacity of the fixing belt 21, the fixing belt 21 preferably has a total thickness equal to or less than 1 mm and a loop diameter equal to or less than 30 mm.

The pressure roller 22 is a rotator (specifically, a second rotator or counter rotator) disposed to face the outer circumferential surface of the fixing belt 21.

Specifically, the pressure roller 22 includes a solid iron core, an elastic layer resting on an outer circumferential surface of the core, and a release layer resting on an outer circumferential surface of the elastic layer. The core may be hollow. The elastic layer is made of, for example, silicone rubber, silicone rubber form, or fluorine rubber. The release layer is made of a fluororesin such as PFA or PTFE.

The heater 23 is a heating source that heats the fixing belt 21. In the present embodiment, a halogen heater is used as the heater 23. Instead of the halogen heater, the heater 23 may be another radiant heater such as a carbon heater or a ceramic heater. In the present embodiment, the two heaters 23 are disposed inside the loop formed by the fixing belt 21. However, the number of the heaters 23 is not limited to two. Alternatively, a single heater 23 may be disposed. Alternatively, three or more heaters 23 may be disposed.

The nip formation pad 24 is disposed inside the loop formed by the fixing belt 21. The nip formation pad 24 forms a nip N between the fixing belt 21 and the pressure roller 22 under pressure from the pressure roller 22. The nip formation pad 24 includes a base pad 29 and a sliding sheet 30.

The base pad 29 is continuously disposed in the longitudinal direction X of the fixing belt 21 and fixed to the stay 25. The shape of the nip N is determined by the base pad 29 under pressure from the pressure roller 22. The base pad 29 is preferably made of a heat-resistant material having a heat-resistant temperature of not less than 200° C. For example, the base pad 29 is made of a typical heat-resistant resin such as polyether sulfone (PES), polyphenylene sulfide (PPS), liquid crystal polymer (LCP), polyether nitrile (PEN), polyamide-imide (PAI), and polyether ether ketone (PEEK). The base pad 29 made of such a heat-resistant material prevents the thermal deformation of the base pad 29 in a fixing temperature range and stabilizes the shape of the nip N. Although FIG. 2 illustrates the nip N having a concave shape, the nip N may be flat or have another shape.

The sliding sheet 30 is a low-friction sheet interposed between the base pad 29 and the inner circumferential surface of the fixing belt 21. The sliding sheet 30 that is interposed between the base pad 29 and the fixing belt 21 reduces the sliding resistance of the fixing belt 21 against the base pad 29. In a case where the base pad 29 is a low-friction pad, the sliding sheet 30 may be omitted.

The stay 25 is a support that supports the nip formation pad 24 toward the pressure roller 22. The stay 25 supporting the nip formation pad 24 prevents the bending of the nip formation pad 24 (in particular, bending throughout the length of the fixing belt 21) under pressure from the pressure roller 22. Thus, the nip N having a uniform width is obtained. The stay 25 is preferably made of an iron-based metal material such as steel use stainless (SUS) or steel electrolytic cold commercial (SECC) to enhance the rigidity.

The reflector 26 reflects radiant heat (infrared rays) emitted from the heaters 23.

The reflector 26 reflects, to the fixing belt 21, the radiant heat emitted from the heaters 23 to efficiently heat the fixing belt 21. As the reflector 26 is interposed between the stay 25 and the heaters 23, the reflector 26 also prevents heat conduction to the stay 25. The reflector 26 thus prevents the flow of heat to a component that does not directly contribute to fixing, to enhance the efficiency of energy consumption. The reflector 26 is made of, for example, a metal material such as aluminum or stainless steel. In particular, in a case where the reflector 26 includes an aluminum base having a surface on which silver having a relatively high reflectance is deposited, the heating efficiency is further enhanced.

The belt holders 27 are a pair of rotator holders that holds the fixing belt 21 such that the fixing belt 21 can rotate. In other words, the fixing belt 21 is rotatably held by the belt holders 27. As illustrated in FIG. 3, the belt holders 27 are inserted into the loop formed by the fixing belt 21 at opposed longitudinal end portions of the fixing belt 21 to hold the fixing belt 21 from inside such that the fixing belt 21 can rotate. Each of the "opposed longitudinal end portions" of the fixing belt 21 described above and the "longitudinal end portion" of the fixing belt 21 in the following description is not limited to a longitudinal edge of the fixing belt 21, which is the most end in the longitudinal direction of the fixing belt 21. Each of the "opposed longitudinal end portions" and the "longitudinal end portion" includes, in addition to the longitudinal edge of the fixing belt 21, a position within a range of one-third length from the longitudinal edge when the fixing belt 21 is equally divided into three in the longitudinal direction of the fixing belt 21. In other words, the belt holder 27 may hold, as the longitudinal end portion of the fixing belt 21, an area not including the longitudinal edge of the fixing belt 21, in addition to an area including the longitudinal edge of the fixing belt 21.

Specifically, the belt holder 27 includes an insertion 27*a*, a restraint 27*b*, and a fixed portion 27*c*. The insertion 27*a* has a C-shaped cross-section and is inserted into the longitudinal end portion of the fixing belt 21. The restraint 27*b* has an outer diameter greater than that of the insertion 27*a*. The fixed portion 27*c* is fixed to a side plate described later. The restraint 27*b* has an outer diameter greater than that of at least the fixing belt 21 to restrain the deviation or movement of the fixing belt 21 in the longitudinal direction X. The insertion 27*a* is inserted into the longitudinal end portion of the fixing belt 21 to hold the fixing belt 21 from inside such that the fixing belt 21 can rotate.

The temperature sensor 28 is a temperature detector that detects the temperature of the fixing belt 21. In the present embodiment, the temperature sensor 28 is a non-contact temperature sensor that is disposed so as not to contact the outer circumferential surface of the fixing belt 21. In this case, the temperature sensor 28 detects the ambient temperature near the outer circumferential surface of the fixing belt 21 as the surface temperature of the fixing belt 21. The temperature sensor 28 is not limited to a non-contact sensor. Alternatively, the temperature sensor 28 may be a contact sensor that contacts the fixing belt 21 to detect the surface temperature of the fixing belt 21. The temperature sensor 28 may be, for example, a thermopile, a thermostat, a thermistor, or a normally closed (NC) sensor.

The fixing device 20 according to the present embodiment operates as follows.

As the pressure roller 22 is rotated in a direction indicated by an arrow in FIG. 2 by driving of a driving source disposed in the body of the image forming apparatus 100, the fixing belt 21 is rotated by the rotation of the pressure roller 22. The heaters 23 generate heat to heat the fixing belt 21. At this time, the amount of heat to be generated by the heaters 23 is controlled based on the temperature of the fixing belt 21 detected by the temperature sensor 28 to achieve a given fixing temperature of the fixing belt 21 at which an image can be fixed. When the temperature of the fixing belt 21 reaches the fixing temperature and the sheet P bearing an unfixed image reaches the nip N between the fixing belt 21 and the pressure roller 22, the fixing belt 21 and the pressure roller 22 apply heat and pressure to the sheet P to fix the image onto the sheet P.

In a fixing device including a nip formation pad such as the nip formation pad 24 described above, when a fixing belt rotates, the fixing belt slides over the nip formation pad and generates sliding resistance between the fixing belt and the nip formation pad. To reduce such sliding resistance, a lubricant such as silicone oil, silicone grease, fluorine grease, or fluorine oil is typically applied so as to be interposed between the fixing belt and the nip formation pad. For example, in the present embodiment, a lubricant 80 is contained in the sliding sheet 30 disposed between the base pad 29 of the nip formation pad 24 and the inner circumferential surface of the fixing belt 21 as illustrated in FIG. 2. As the lubricant 80 oozes out from the sliding sheet 30, the lubricant 80 is interposed between the nip formation pad 24 and the fixing belt 21.

Figure 4:
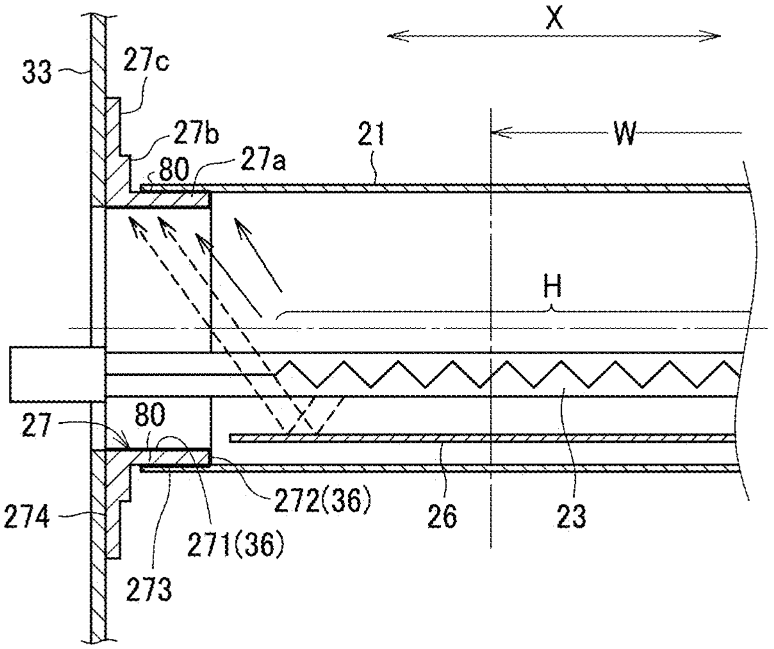
FIG. 4 is a cross-sectional view of an end portion of the fixing device of FIG. 2, taken along a longitudinal direction of a fixing belt included in the fixing device.

In the configuration in which the fixing belt 21 is held by the pair of belt holders 27 as described above, when the fixing belt 21 rotates, the fixing belt 21 slides over each of the belt holders 27. At this time, the sliding resistance is also generated between each of the belt holders 27 and the fixing belt 21. To reduce the sliding resistance, the lubricant 80 as described above is also interposed between each of the belt holders 27 and the fixing belt 21 as illustrated in FIG. 4.

In a configuration including slide aids such as the nip formation pad and the belt holders over which the fixing belt slides, a lubricant such as silicone oil, silicone grease, fluorine grease, or fluorine oil is typically used to enhance the slidability of the fixing belt. However, when some low-molecular-weight components of the lubricant are volatilized with an increase in the temperature of the fixing device and aggregated by being cooled in the atmosphere, fine particles are generated and may be released from the fixing device. The "fine particles" include fine particles (FP) and ultrafine particles (UFP) measured under measurement conditions for examining the relation described later with reference to FIG. 12. The "fine particles" are particles each having a diameter of 5.6 nm to 560 nm. In the following description, the fine particles and the ultrafine particles may be referred to simply as FP/UFP.

Currently, due to an increase in the awareness of environmental issues, the reduction of FP/UFP discharged from products has been desired. The image forming apparatuses that reduce the generation of FP/UFP are also to be developed.

Figure 12:
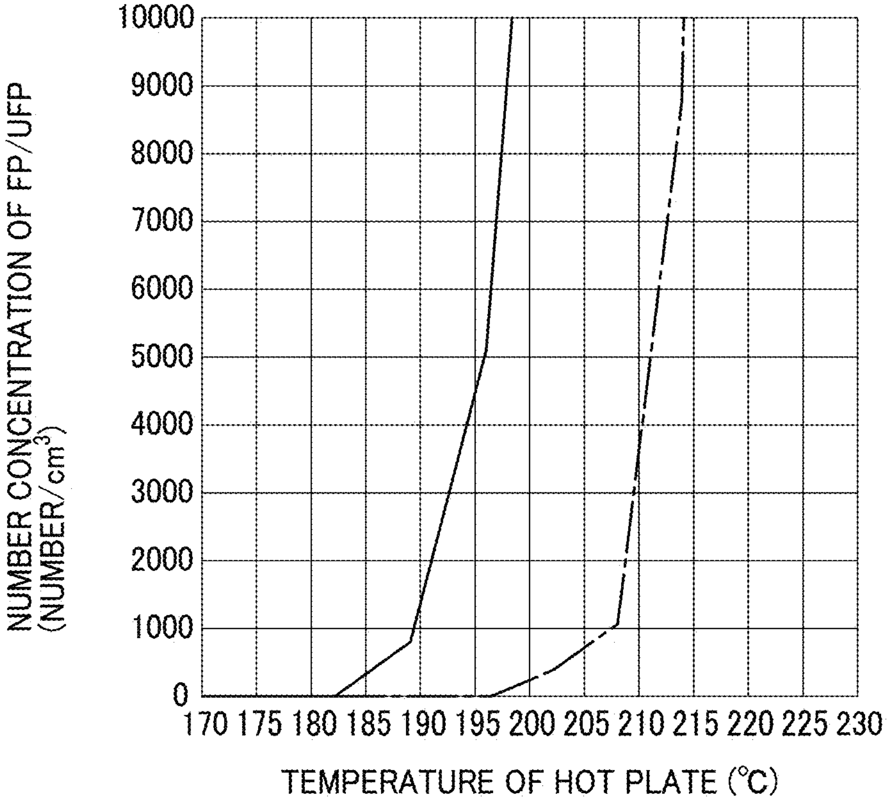
FIG. 12 is a graph illustrating an example relation between the temperature of a lubricant and the concentration of generated fine particles.

In view of the above, to consider how to reduce the generation of FP/UFP from the fixing devices, the inventors conducted a test to examine the relation between the temperature rise of silicone oil and fluorine grease used as lubricants and the concentration of FP/UFP generated from the lubricants (the number of FP/UFP generated per 1 $cm^3$). FIG. 12 illustrates the results.

Figure 13:
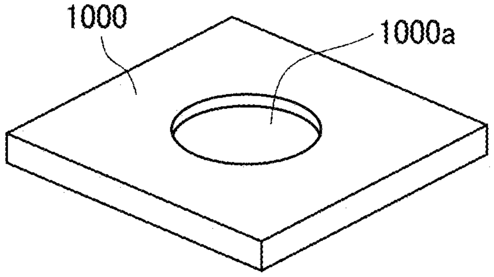
FIG. 13 is a perspective view of a sample container.

In this test, a liquid or semi-solid lubricating substance in a sample container was heated in a chamber of 1 $m^3$ (with a ventilating frequency of 5 times) in accordance with Japanese Industrial Standards (JIS) A 1901. As illustrated in FIG. 13, an aluminum plate of 50 mm×50 mm×5 mm provided with a recess 1000*a* having a diameter of 22 mm and a depth of 2 mm was used as a sample container 1000. A sample was disposed in the recess 1000*a*. The sample container 1000 on which the sample was placed was placed on a hot plate of a heating device (Clean Hot Plate MH-180CS manufactured by AS ONE Corporation, Controller MH-3CS manufactured by AS ONE Corporation). The sample was heated at a preset temperature of 250° C. While the temperature of the hot plate was monitored, the number concentration of FP/UFP in the chamber was measured with a measuring device (Model 3091 FAST MOBILITY PARTICLE SIZER (FMPS), TSI Incorporated), with the Use Averaging Interval at Export of 30 seconds. Fluorine grease and silicone oil were used as lubricants with a sample amount of 36 microliters (μl). In FIG. 12, the solid line indicates the number concentration of FP/UFP generated from the fluorine grease, whereas the alternate long and short dash line indicates the number concentration of FP/UFP generated from the silicone oil. In FIG. 12, the horizontal axis indicates the temperature of the hot plate. Since the temperature rise of the hot plate and the temperature rise of the lubricant change substantially in synchronization with each other, the temperature of the hot plate is regarded as the temperature of the lubricant here.

As indicated by the solid line in FIG. 12, the generation of FP/UFP from the fluorine grease started when the temperature reached about 185° C. The number concentration of FP/UFP generated from the fluorine grease started rapidly increasing when the temperature exceeded about 194° C. On the other hand, as indicated by the alternate long and short dash line in FIG. 12, the generation of FP/UFP from the silicone oil started when the temperature reached about 200° C. The number concentration of FP/UFP generated from the silicone oil started rapidly increasing when the temperature exceeded about 210° C. The temperature at which the concentration rapidly increases is defined as a fine-particle generation temperature and is defined as a temperature at which the number concentration of FP/UFP in the chamber is equal to or greater than 4000/$cm^3$.

As described above, since the FP/UFP are generated from the fluorine grease and the silicone oil when the temperature reaches 185° C. and 200° C., respectively, the FP/UFP may be generated from the lubricant in the fixing device in which the temperature can exceed 200° C. To effectively reduce such FP/UFP, a temperature rise in a portion of the fixing device where FP/UFP are likely to be generated is to be prevented.

However, the portion of the fixing device from which the FP/UFP are mostly generated has not been specified. For this reason, the inventors have conducted intensive studies on a main source that generates the FP/UFP. As a result, the inventors have found that a large amount of FP/UFP is generated mainly from the lubricant adhering to the belt holder. A description is now given of the mechanism of generation of FP/UFP and the reason why a large amount of FP/UFP is generated mainly from the lubricant adhering to the belt holder.

Figure 14:
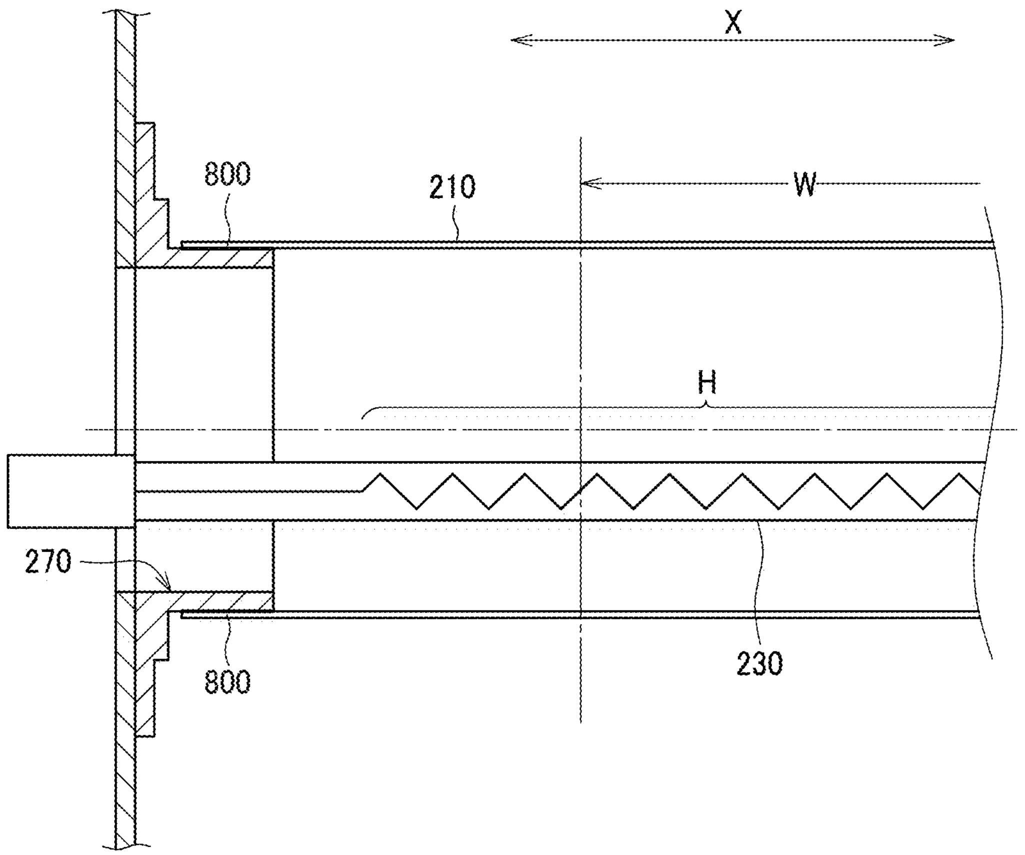
FIG. 14 RELATED ART
FIG. 14 is a cross-sectional view of an end portion of a fixing device according to a comparative example, taken along a longitudinal direction of a fixing belt included in the fixing device.

FIG. 14 is a cross-sectional view of a configuration of a longitudinal end portion of a fixing belt in a fixing device according to a comparative example.

As illustrated in FIG. 14, the fixing device according to the comparative example includes a belt holder 270 that holds a longitudinal end portion of a fixing belt 210, like the fixing device according to the embodiment described above. A lubricant 800 is applied on an outer circumferential surface of the belt holder 270 to reduce the sliding resistance of the fixing belt 210. In a case where the lubricant 800 is not actively applied on the outer circumferential surface of the belt holder 270, a lubricant interposed between the fixing belt 210 and a nip formation pad may flow with the rotation of the fixing belt 210 and adhere to the outer circumferential surface of the belt holder 270.

In the fixing device according to the comparative example, when the radiant heat (infrared rays) is emitted from a heater 230, the belt holder 270 is irradiated with the radiant heat thus emitted. Thus, the belt holder 270 is heated. In the configuration as illustrated in FIG. 14 in which a heat-generating portion H of the heater 230 is extended to the outside of a maximum sheet conveyance area W to enhance the fixing property at an end portion of an image immediately after the start of the image forming operation, the belt holder 270 is easily irradiated with the radiant heat. In other words, the temperature of the belt holder 270 is easily increased. As a result, when the temperature of the belt holder 270 exceeds the aforementioned temperature at which the FP/UFP are generated, some low-molecular-weight components of the lubricant 800 adhering to the belt holder 270 are volatilized and aggregated when cooled in the atmosphere. The aggregated FP/UFP are scattered and discharged from the fixing device. As described above, in the fixing device according to the comparative example, the temperature rise of the belt holder 270 irradiated with the radiant heat from the heater 230 may generate the FP/UFP from the lubricant 800 adhering to the belt holder 270. As illustrated in the test results in FIG. 12, the number of FP/UFP that are generated from the lubricant may increase as the temperature of the belt holder 270 increases. To effectively reduce the number of FP/UFP thus generated, the temperature rise of the belt holder is to be prevented.

In the embodiments of the present disclosure, the following measures are taken to prevent the temperature rise of the belt holder.

FIG. 4 is a cross-sectional view of an end portion of the fixing device 20, taken along the longitudinal direction X of the fixing belt 21.

As illustrated in FIG. 4, in the present embodiment, each of an inner circumferential face 271 of the belt holder 27 and a first end face 272 of the belt holder 27 is provided with a reflector 36 that reflects the radiant heat (infrared rays) from the heater 23. The first end face 272 of the belt holder 27 is an end face of the insertion 27*a* and disposed inside the loop formed by the fixing belt 21. When the radiant heat is emitted from the heater 23, the reflector 36 reflects the radiant heat emitted toward the inner circumferential face 271 and the first end face 272 of the belt holder 27. Thus, the reflector 36 is disposed at least at a portion, which is irradiated with the radiant heat emitted from the heater 23, of the surface of the belt holder 27.

Examples of the aforementioned "portion irradiated with the radiant heat" in the surface of the belt holder 27 include, but are not limited to, a portion directly irradiated with the radiant heat emitted from the heater 23 as indicated by solid arrows in FIG. 4 and a portion irradiated with the radiant heat reflected by the reflector 26 as indicated by dotted arrows in FIG. 4. In a configuration in which belt holders are inserted in the loop formed by a fixing belt as in the present embodiment, an inner circumferential surface of each of the belt holders is typically irradiated with radiant heat emitted from a heater. Thus, the examples of the "portion irradiated with the radiant heat" in this case include at least the inner circumferential face 271 of the belt holder 27. In other words, in the present embodiment, the inner circumferential face 271 of the belt holder 27 is included in both the examples of the portion directly irradiated with the radiant heat emitted from the heater 23 and the examples of the portion irradiated with the radiant heat reflected by the reflector 26. The entire inner circumferential face 271 of the belt holder 27 may be provided with the reflector 36. Alternatively, a part of the inner circumferential face 271 of the belt holders 27 may be provided with the reflector 36. Since at least the portion irradiated with the radiant heat is to be provided with the reflector 36, other portions that are not irradiated with the radiant heat may not be provided with the reflector 36. In the present embodiment, either an outer circumferential face 273 of the belt holder 27 or a second end face 274 of the belt holder 27 is not provided with the reflector 36. The second end face 274 of the belt holder 27 is opposite to the first end face 272 in the longitudinal direction X and fixed to a side plate 33.

Figure 5:
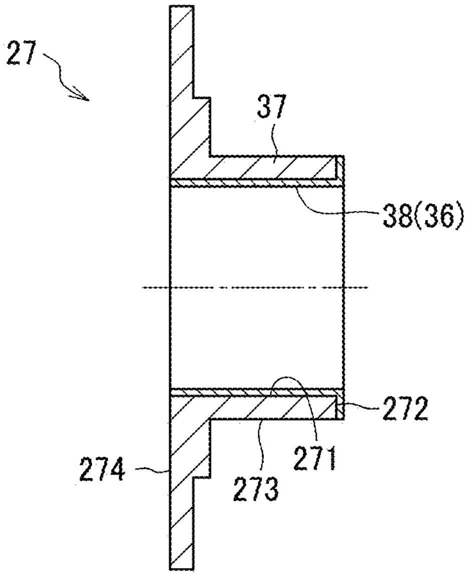
FIG. 5 is a cross-sectional view of a belt holder according to a modification of the above embodiment.

The entire belt holder 27 may include a material having a relatively high reflectance. Alternatively, as illustrated in FIG. 5, the belt holder 27 may include a base 37 and a surface layer 38 resting on the surface of the base 37. The surface layer 38 is made of a material having a relatively high reflectance and includes the reflector 36. The belt holder 27 including the reflector 36 or the surface layer 38 including the reflector 36 is preferably made of a material having a heat-resistant temperature of not less than 280° C. Specifically, examples of the material of the belt holder 27 or the surface layer 38 include, but are not limited to, metal materials such as aluminum and silver.

The surface layer 38 may be, for example, an aluminum vapor deposition layer or a silver vapor deposition layer that is formed on the surface of the base 37 made of resin. The surface layer 38 may be deposited by physical vapor deposition (PVD) or chemical vapor deposition (CVD). In the physical vapor deposition, a vapor deposition material such as aluminum or silver is heated and evaporated to be deposited on an object to form a film. The physical vapor deposition also includes vacuum deposition in which the vapor deposition material is evaporated in vacuum. On the other hand, in the chemical vapor deposition, the vapor deposition material is heated and vaporized. Thereafter, a reaction chamber is filled with a mixture of the vaporized material and a reaction gas. The gas is brought into contact with an object heated in the reaction chamber to form a film on the surface of the object. The chemical vapor deposition also includes a way in which a voltage is applied to convert a gas into plasma.

Alternatively, the surface layer 38 may be an aluminum film adhering to the surface of the resin base 37. The film as the surface layer 38 may be made of a material other than aluminum. Preferably, the surface of the film and the adhesive layer have a heat resistance of not less than 200° C.

Alternatively, a paint having a relatively high degree of whiteness may be applied to the surface of the base 37 to form a paint layer as the surface layer 38. In this case, as described above, the paint of the surface layer 38 is preferably made of a material having a heat-resistant temperature of not less than 200° C.

As described above, in the present embodiment, the portion of the belt holder 27 irradiated with the radiant heat is provided with the reflector 36, which reflects the radiant heat emitted from the heater 23 and prevents the temperature rise of the belt holder 27. Preventing the temperature rise of the belt holder 27 reduces the generation of FP/UFP from the lubricant adhering to the belt holder 27.

As the reflectance of the reflector 36 is higher, the belt holder 27 is less likely to be affected by the radiant heat. Thus, the temperature rise of the belt holder 27 is effectively prevented. The reflectance is herein a reflectance in a wavelength range of the radiant heat emitted from the heater. The wavelength range of the radiant heat is from 900 nm to 1600 nm or from 1000 nm to 1300 nm.

The inventors conducted a test to examine the relation between the reflectance of the reflector 36 and the temperature rise of the belt holder 27.

Figure 6:
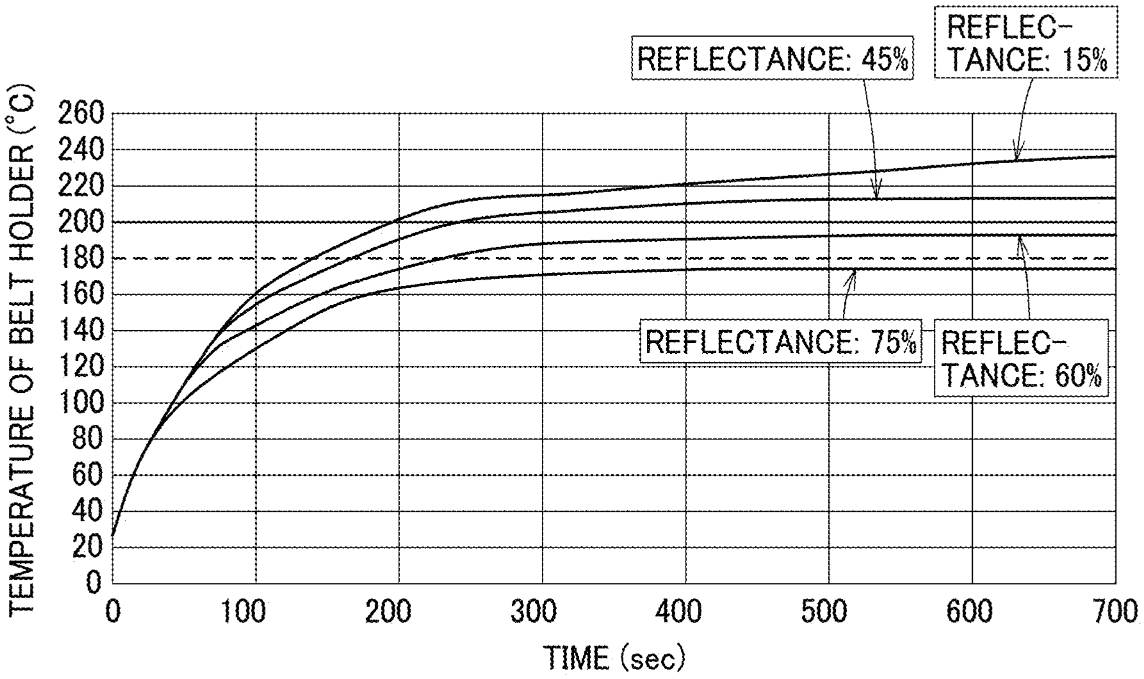
FIG. 6 is a graph illustrating an example relation between the reflectance of a reflector and the temperature rise of a belt holder.

FIG. 6 illustrates the results.

In this test, multiple belt holders including reflectors with different reflectances were prepared. The reflectance of the reflector of each of the belt holders was measured at an incident angle of 5° with a spectrophotometer (ultraviolet-visible infrared spectrophotometer UH4150 manufactured by Hitachi High-Tech Science Corporation). The reflectance in the following description is also the reflectance measured by this measuring way. Image forming apparatuses including fixing devices with different belt holders were installed in a measurement room in an environment of 23° C. After the power of the image forming apparatuses was turned on to start up the image forming apparatuses and the image forming apparatuses shifted to an energy-saving state, the door of the measurement room was closed. The printing was instructed after a lapse of time (for example, 60 minutes) during which the measurement room was sufficiently ventilated. The conveyance of sheets was started at a printing speed of 60 pages per minute (ppm). Then, the temperature of the belt holders was measured for 10 minutes with the time when the first sheet was ejected as the start of printing.

As illustrated in FIG. 6, the temperature of the belt holder including the reflector having a reflectance of 15% reached 230° C. when 10 minutes (i.e., 600 seconds) of continuous printing elapsed. In this case, since the temperature of the belt holder exceeds 210° C. at which the FP/UFP derived from the silicone oil rapidly increases and 194° C. at which the FP/UFP derived from the fluorine grease rapidly increases, the FP/UFP that are generated from these lubricants are not effectively reduced. Although the temperature rise of the belt holder including the reflector having a reflectance of 45% was somewhat reduced as illustrated in FIG. 6, the temperature of the belt holder exceeded 210° C. when 10 minutes of continuous printing elapsed. In short, the reflector having a reflectance of 45% is still insufficient to effectively reduce the generation of FP/UFP.

On the other hand, the temperature of the belt holder including the reflector having a reflectance of 60% was 194° C. when 10 minutes of continuous printing elapsed. In other words, the temperature of the belt holder including the reflector having a reflectance of 60% is lower than 210° C. at which the FP/UFP derived from the silicone oil rapidly increases and 200° C. at which the generation of the FP/UFP derived from the silicone oil starts. Further, the temperature of the belt holder including the reflector having a reflectance of 60% does not exceed 194° C. at which the FP/UFP derived from the fluorine grease rapidly increases. The temperature of the belt holder including the reflector having a reflectance of 75% was 175° C., which is lower than the temperature (185° C.) at which the generation of the FP/UFP derived from the fluorine grease starts, when 10 minutes of continuous printing elapsed.

From the viewpoint of more reliably reducing the FP/UFP that are generated from the lubricant on the belt holder, the temperature of the belt holder during printing is preferably lower than the temperature at which the FP/UFP are generated from the lubricant on the belt holder. Typically, image forming apparatuses in the market are mostly used for continuous printing within several minutes and are rarely used for continuous printing for five minutes or longer. For this reason, the temperature of the belt holder during 10 minutes of continuous printing lower than the temperature at which the FP/UFP are generated from the lubricant on the belt holder is sufficient to reduce the generation of FP/UFP.

Based on the aforementioned test results, the reflector having a reflectance of not less than 60% effectively reduces the generation of FP/UFP derived from the silicone oil and the generation of FP/UFP derived from the fluorine grease. For this reason, in the embodiments of the present disclosure, the reflectance of the reflector is not less than 60%.

The reflector having a reflectance of not less than 75% effectively reduces the generation of FP/UFP derived from the silicone oil and the generation of FP/UFP derived from the fluorine grease. In other words, the reflector preferably has a reflectance of not less than 75% to reduce the generation of FP/UFP more highly than the reflector having a reflectance of 60%.

Halogen heaters that are used as heating sources have different color temperatures depending on the application. A halogen heater having a color temperature of about 2500K is typically used for heating in the fixing device. For this reason, the reflectance of the reflector is preferably not less than 60% or not less than 75% in a wavelength range of a halogen heater having a relatively high emission intensity, specifically, a wavelength range of 900 nm to 1600 nm, and more preferably, a wavelength range of 1000 nm to 1300 nm.

As described above, in the present embodiment, the belt holder includes the reflector having a reflectance of not less than 60% to reflect the radiant heat emitted from the heater and maintain the temperature of the belt holder to be equal to or less than 210° C. during 10 minutes of continuous printing. Accordingly, particularly when silicone oil is used as a lubricant, the number of generated FP/UFP is greatly reduced as compared with the comparative example.

By increasing the reflectance of the reflector, for example, by setting the reflectance to not less than 75%, the generation of FP/UFP is more highly reduced. Although, in the test results described above, 60% and 75% are given as examples of the reflectance of the reflector that can effectively reduce the generation of FP/UFP, the reflectance may be set as appropriate for the temperature at which the FP/UFP are generated from the lubricant that is used, provided that the reflectance is not less than 60%.

The belt holder effectively reduces the generation of FP/UFP derived from the silicone oil with the reflector having a reflectance desired to maintain the temperature of the belt holder to be equal to or less than 200° C. during 10 minutes of continuous printing. The belt holder of which the temperature remains not greater than 194° C. during 10 minutes of continuous printing reduces the generation of FP/UFP derived from the fluorine grease. The belt holder of which the temperature remains not greater than 185° C. during 10 minutes of continuous printing more effectively reduces the generation of FP/UFP derived from the fluorine grease. In a case where silicone grease is used instead of silicone oil, the same effect is obtained by controlling the temperature of the belt holder in the same manner as in the case of silicone oil. In a case where fluorine oil is used instead of fluorine grease, the same effect is obtained by controlling the temperature of the belt holder in the same manner as in the case of fluorine grease.

The "temperature of the belt holder during 10 minutes of continuous printing" is a temperature measured by the procedure in the test described above. Specifically, an image forming apparatus including a fixing device (or heating device) is installed in a measurement room in an environment of 23° C. After the power of the image forming apparatus is turned on to start up the image forming apparatus and a standby time (for example, 60 minutes) has elapsed, the printing is instructed. As a printing condition, the printing speed is set as a default setting, in the highest mode. The sheets that are used have a basis weight of 70 $g/m^2$ and an A4 size or a letter size. In a case where the sheets can be conveyed in a width direction of the sheets, the sheets are conveyed in the width direction of the sheets; otherwise, the sheets are conveyed in a longitudinal direction of the sheets. Specifically, in a case where the sheets are conveyed in the width direction of the sheets, the sheets are conveyed with the long side of the sheets orthogonal to the direction in which the sheets are conveyed. In a case where the sheets are in the longitudinal direction of the sheets, the sheets are conveyed with the short side of the sheets orthogonal to the direction in which the sheets are conveyed. Then, the temperature of the belt holder is measured with a thermocouple for 10 minutes with the time when the first sheet is ejected as the start of printing. In a case where the time during which the continuous printing can be performed is 10 minutes or less due to the capacity of the output tray or the capacity of the input tray, the temperature of the belt holder is measured for the time during which the continuous printing can be performed. In addition to the measuring way specified above, the measurement may be performed with an apparatus and under conditions compliant with the fine particle standards specified by the Blue Angel.

Since the temperature rise of the belt holder as a factor of generating the FP/UFP is more remarkable in the image forming apparatus in which the number of sheets conveyed per unit time is larger, a great effect is expected when the embodiments of the present disclosure are applied particularly to the image forming apparatus in which a large number of sheets can be conveyed.

Figure 7:
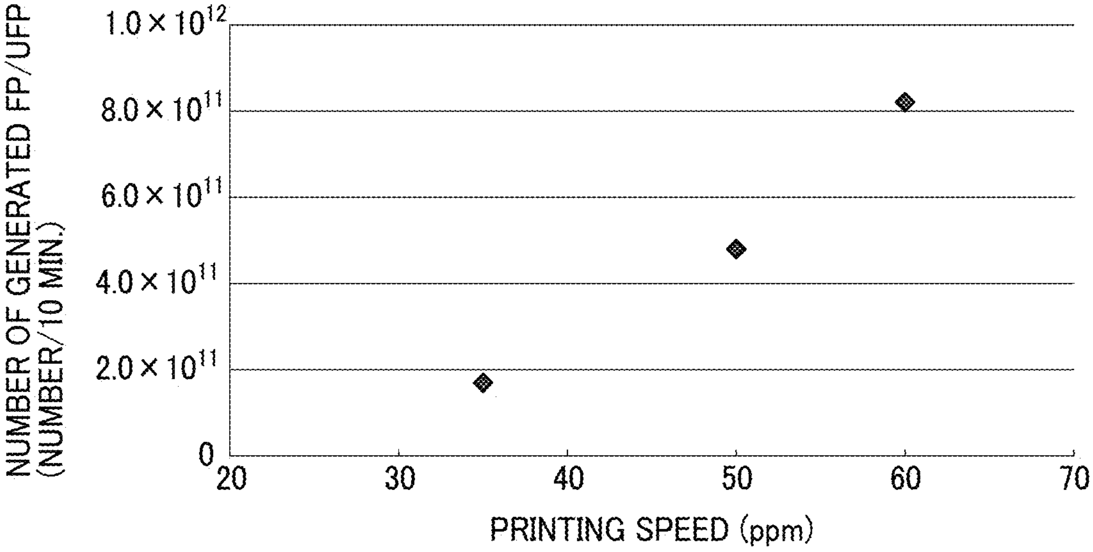
FIG. 7 is a graph illustrating an example relation between the printing speed and the number of generated fine particles.

FIG. 7 illustrates an example relation between the printing speed and the number of generated FP/UFP.

In FIG. 7, the number of FP/UFP generated from the fixing device during 10 minutes of continuous printing becomes particularly large when the printing speed exceeds 50 pages per minute (ppm). Thus, when the embodiments of the present disclosure are applied to a fixing device or an image forming apparatus having a printing speed equal to or greater than 50 ppm, a greater effect is expected. In addition, when the embodiments of the present disclosure are applied to a fixing device in which the heaters 23 are disposed inward from the belt holders 27 as illustrated in FIG. 4, a great effect is expected because the temperature of the belt holders 27 easily rises.

Although the fluorine grease, the fluorine oil, the silicone oil, and the silicone grease have been described as example substances that generate the FP/UFP in the present embodiment, another liquid or semi-solid lubricating substance (i.e., liquid or semi-solid substance having lubricity) besides these substances may be used in another embodiment of the present disclosure. In the embodiments of the present disclosure, the lubricating substance (i.e., the substance having lubricity) refers to a substance that is interposed between components to reduce frictional resistance between the components. Even in a case where another lubricating substance besides the fluorine grease and the silicone oil is contained in the fixing device, according to the embodiments of the present disclosure, the temperature rise of the belt holder is reduced while the temperature rise of the lubricating substance adhering to the belt holder is also reduced. Thus, the generation of FP/UFP is effectively reduced. In a case where two or more types of lubricants adhere to the belt holder, the temperature of the belt holder during 10 minutes of continuous printing is preferably controlled to be lower than the lower one of the temperatures at which the FP/UFP are generated from the lubricants.

According to the embodiments of the present disclosure, the configuration of the fixing device is not limited to the configuration described above. The embodiments of the present disclosure can be applied to fixing devices having various configurations. A description is now given of some examples of the configuration of the fixing device to which the embodiments of the present disclosure are applicable.

Figure 8:
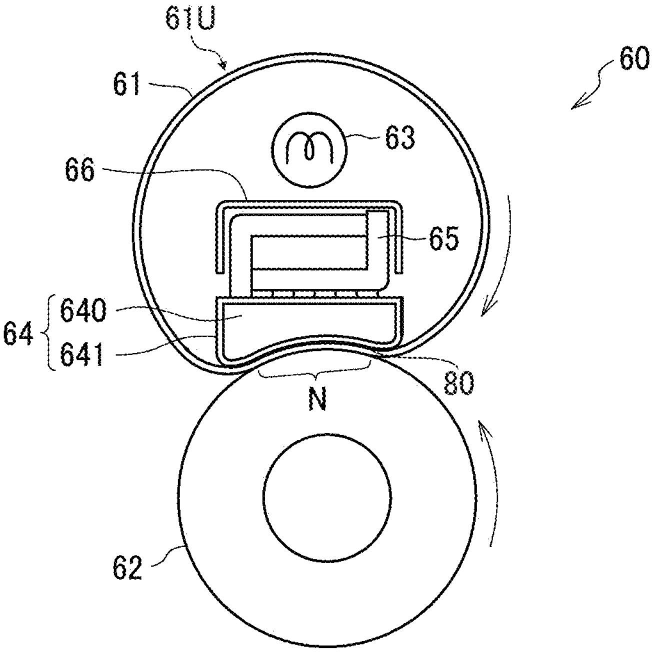
FIG. 8 is a cross-sectional view of a fixing device according to a modification of the above embodiment.
Figure 9:
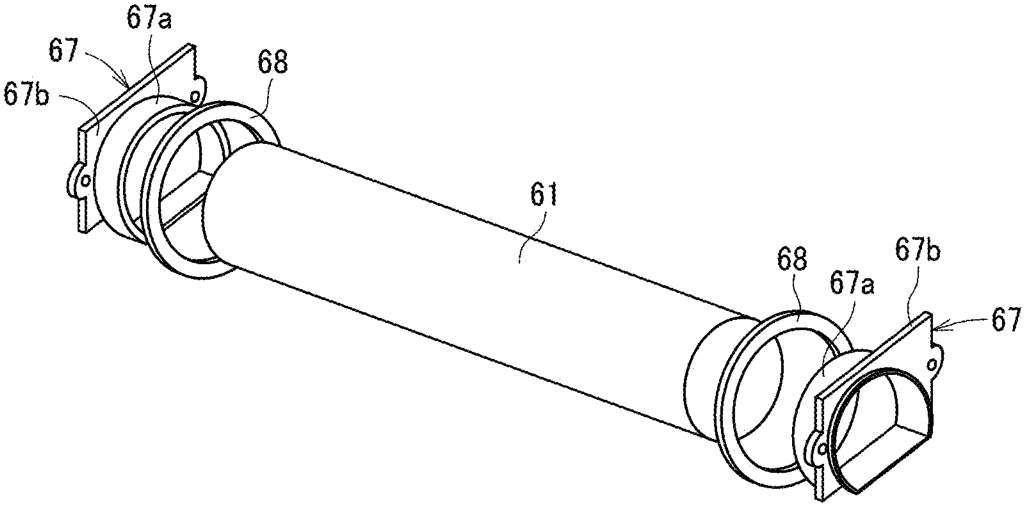
FIG. 9 is an exploded perspective view of the fixing device illustrated in FIG. 8.

A fixing device 60 that is illustrated in FIGS. 8 and 9 is a fixing device including a halogen heater (i.e., a heater 63) as a heating source, like the fixing device 20 illustrated in FIGS. 2 and 3. Specifically, the fixing device 60 that is illustrated in FIGS. 8 and 9 includes a fixing belt 61 as a first rotator, a pressure roller 62 as a second rotator, the heater 63 as a heating source, a nip formation pad 64, a support 65, a reflective plate 66 as a reflector, retention frames 67 as rotator holders (see FIG. 9), and rings 68 as slide aids (see FIG. 9). The fixing belt 61 and the components disposed inside a loop formed by the fixing belt 61 constitute a belt unit 61U, which is detachably coupled to the pressure roller 62.

The fixing belt 61, the pressure roller 62, the heater 63, the nip formation pad 64, the support 65, the reflective plate 66, and the retention frames 67 that are illustrated in FIGS. 8 and 9 are basically the same in function and configuration as the fixing belt 21, the pressure roller 22, the heater 23, the nip formation pad 24, the stay 25, the reflector 26, and the belt holders 27, respectively, illustrated in FIGS. 2 and 3. The nip formation pad 64 includes a metal base pad 640 and a fluororesin sliding sheet 641 that is interposed between the base pad 640 and an inner circumferential surface of the fixing belt 61.

The ring 68 is mounted on an outer circumferential surface of a cylinder 67*a* as an insertion of the retention frame 67, which is inserted into the loop formed by the fixing belt 61. The ring 68 is interposed between a longitudinal edge of the fixing belt 61 and a fixing plate 67*b* as a restraint of the retention frame 67. As the fixing belt 61 rotates, the ring 68 rotates together with the fixing belt 61, or the fixing belt 61 slides over the low-friction ring 68. Thus, the sliding resistance that is generated between the fixing belt 61 and the retention frame 67 is reduced.

According to one or more embodiments of the present disclosure, the fixing device may include the rings 68 as described above.

Figure 10:
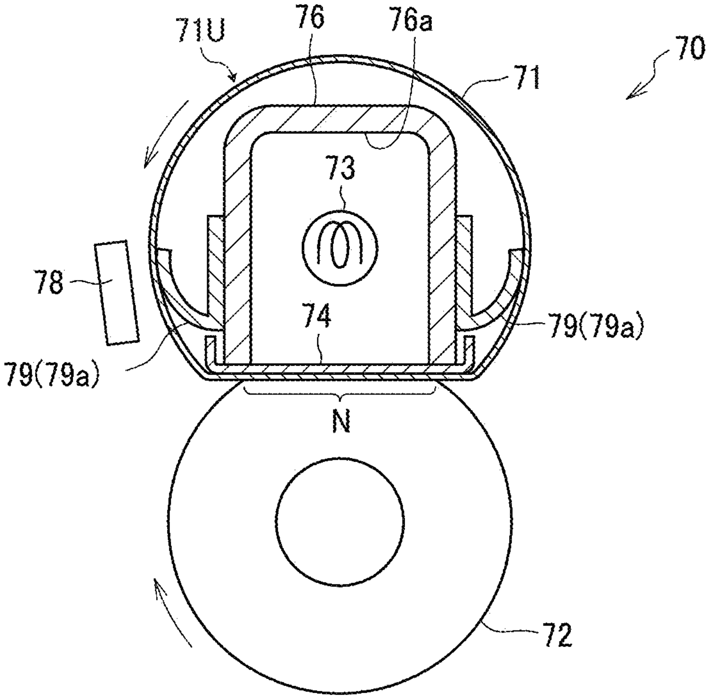
FIG. 10 is a cross-sectional view of a fixing device according to another modification of the above embodiment.
Figure 11:
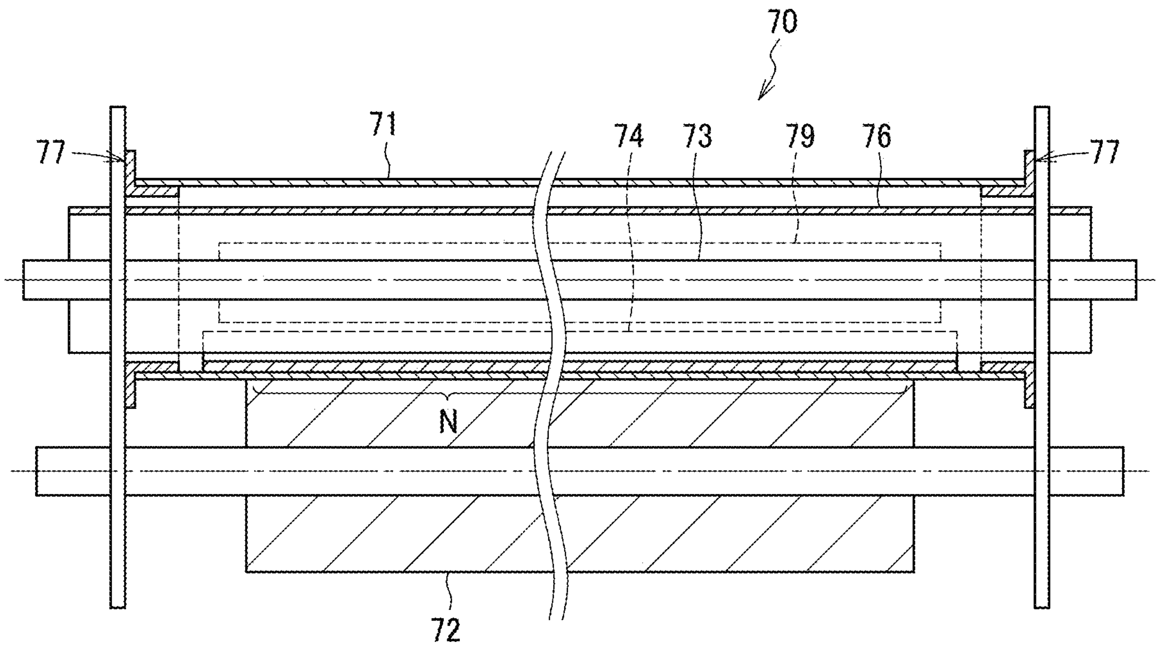
FIG. 11 is a cross-sectional view of the fixing device illustrated in FIG. 10, taken along a longitudinal direction of a fixing belt included in the fixing device.

A fixing device 70 that is illustrated in FIGS. 10 and 11 is a fixing device including a halogen heater 73 as a heating source, like the fixing device 20 illustrated in FIGS. 2 and 3. Specifically, the fixing device 70 that is illustrated in FIGS. 10 and 11 includes a fixing belt 71 as a first rotator, a pressure roller 72 as a second rotator, the halogen heater 73 as a heating source, a nip formation pad 74, a reflector 76, belt supports 77 as rotator holders (see FIG. 11), a temperature sensor 78 as a temperature detector, and guides 79. The fixing belt 71 and the components disposed inside a loop formed by the fixing belt 71 constitute a belt unit 71U, which is detachably coupled to the pressure roller 72.

The fixing belt 71, the pressure roller 72, the halogen heater 73, the nip formation pad 74, the reflector 76, the belt supports 77, and the temperature sensor 78 that are illustrated in FIGS. 10 and 11 are basically the same in function as the fixing belt 21, the pressure roller 22, the heater 23, the nip formation pad 24, the reflector 26, the belt holders 27, and the temperature sensor 28, respectively, illustrated in FIGS. 2 and 3.

Unlike the reflector 26 that reflects the radiant heat emitted from the heater 23 to the fixing belt 21 in the fixing device 20, the reflector 76 that is illustrated in FIGS. 10 and 11 reflects the radiant heat (infrared rays) emitted from the halogen heater 73 mainly to the nip formation pad 74, not to the fixing belt 71.

The reflector 76 has a U-shaped cross-section to cover the outside of the halogen heater 73. The reflector 76 has an inner face 76*a* facing the halogen heater 73 and serving as a reflecting surface having a relatively high reflectance. When the radiant heat is emitted from the halogen heater 73, the inner face 76*a* as a reflecting surface of the reflector 76 reflects the radiant heat to the nip formation pad 74.

As a result, the nip formation pad 74 is heated by the radiant heat emitted from the halogen heater 73 toward the nip formation pad 74 and the radiant heat reflected by the reflector 76 to the nip formation pad 74. The heat is conducted from the nip formation pad 74 to the fixing belt 21 at the nip N. In this case, the nip formation pad 74 that forms the nip N functions as a heat conductor that conducts heat to the fixing belt 71 at the nip N. To conduct heat, the nip formation pad 74 is made of a metal material having good thermal conductivity such as copper or aluminum.

The reflector 76 also functions as a support (stay) that supports the nip formation pad 74. Since the reflector 76 supports the nip formation pad 74 throughout the length of the fixing belt 71, the bending of the nip formation pad 74 is prevented and the nip N having a uniform width is formed between the fixing belt 71 and the pressure roller 72. The reflector 76 is preferably made of a metal material having relatively high rigidity such as SUS or SECC to ensure the function as a support.

The guides 79 are disposed inside the loop formed by the fixing belt 71 to guide the rotatable fixing belt 71 from the inside. Each of the guides 79 has a guide face 79*a* curving along an inner circumferential surface of the fixing belt 71. As the fixing belt 71 is guided along the guide face 79*a*, the fixing belt 71 smoothly rotates without being largely deformed.

According to one or more embodiments of the present disclosure, the fixing device may conduct heat from the halogen heater 73 via the nip formation pad 74 having good thermal conductivity to heat the fixing belt 71 as described above.

The embodiments described above are applied to the fixing device included in the electrophotographic image forming apparatus. However, one or more embodiments of the present disclosure may be applied to a heating device other than the fixing device, such as a drying device that is included in an inkjet image forming apparatus and dries liquid such as ink applied to a sheet.

Figure 15:
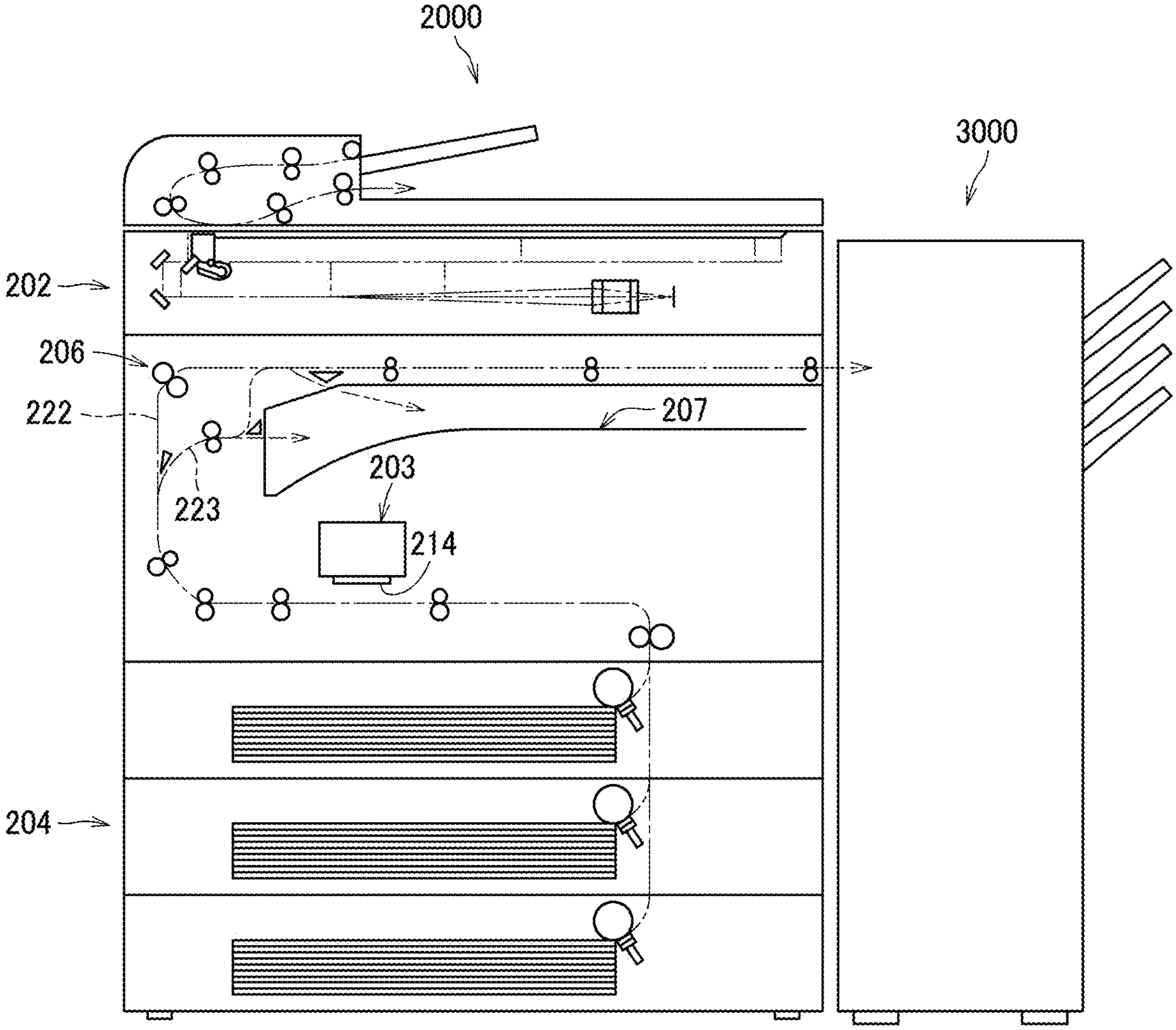
FIG. 15 is a diagram illustrating an inkjet image forming apparatus including a drying device according to an embodiment of the present disclosure.

FIG. 15 illustrates an inkjet image forming apparatus including a drying device according to an embodiment of the present disclosure.

An inkjet image forming apparatus 2000 that is illustrated in FIG. 15 includes an image reading device 202, an image forming device 203, a sheet supplying device 204, a drying device 206, and an output section 207. A sheet aligning apparatus 3000 is disposed beside the inkjet image forming apparatus 2000.

In response to an instruction to start a printing operation, the sheet supplying device 204 feeds a sheet such as a sheet of paper as a recording medium in the inkjet image forming apparatus 2000. When the sheet is conveyed to the image forming device 203, the image forming device 203 discharges ink from a liquid discharge head 214 to the sheet according to image information of a document read by the image reading device 202 or print information instructed to print by a terminal, to form an image on the sheet.

The sheet bearing the image is selectively guided to a conveyance passage 222 or a conveyance passage 223. When the sheet is guided to the conveyance passage 222, the sheet passes through the drying device 206. When the sheet is guided to the conveyance passage 223, the sheet does not pass through the drying device 206. When the sheet is guided to the drying device 206, the drying device 206 accelerates the drying of the ink on the sheet. The sheet is then guided to the output section 207 or the sheet aligning apparatus 3000. By contrast, when the sheet is guided to the conveyance passage 223 along which the sheet does not pass through the drying device 206, the sheet is guided to the output section 207 or the sheet aligning apparatus 3000 as is. The sheet aligning apparatus 3000 aligns and places the sheets guided to the sheet aligning apparatus 3000.

Figure 16:
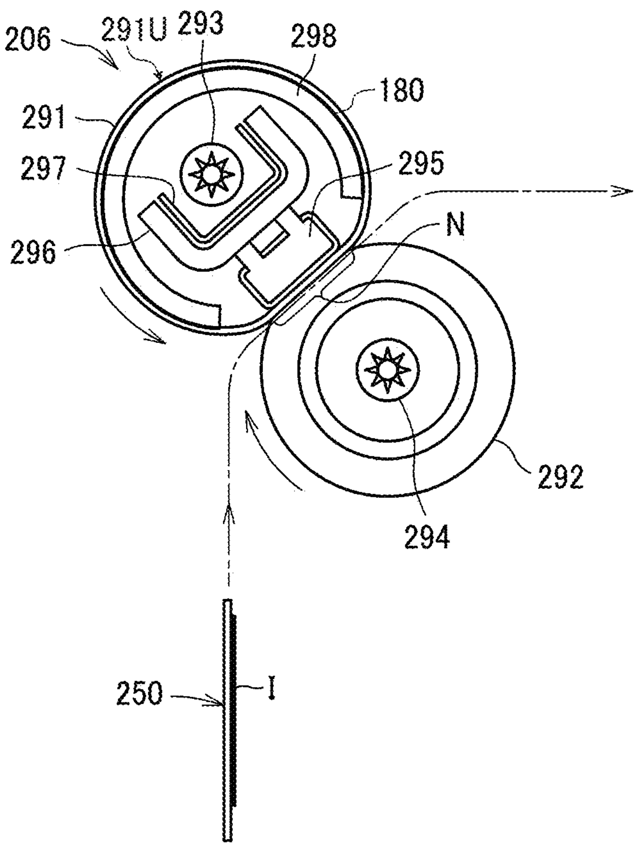
FIG. 16 is a diagram illustrating an example drying device.

As illustrated in FIG. 16, the drying device 206 includes a heating belt 291 as a first rotator, a heating roller 292 as a second rotator, a first heater 293 as a heating source that heats the heating belt 291, a second heater 294 as a heating source that heats the heating roller 292, a nip formation pad 295, a stay 296 as a support, a reflector 297, and belt holders 298 as rotator holders that hold the heating belt 291 such that the heating belt 291 can rotate. The heating belt 291 and the components disposed inside a loop formed by the heating belt 291 constitute a belt unit 291U, which is detachably coupled to the heating roller 292.

The nip formation pad 295 contacts an outer circumferential surface of the heating roller 292 via the heating belt 291 to form a nip N between the heating belt 291 and the heating roller 292. As illustrated in FIG. 16, when a sheet 250 bearing an image, illustrated as ink I in FIG. 16, is conveyed to the nip N of the drying device 206, the sheet 250 is heated while being conveyed by the heating belt 291 and the heating roller 292 rotating in the directions indicated by arrows in FIG. 16. Thus, the drying of the ink I on the sheet 250 is accelerated.

In the drying device 206 illustrated in FIG. 16, the heating belt 291 is rotatably held by the pair of belt holders 298 disposed at opposed longitudinal end portions of the heating belt 291. When the heating belt 291 is heated and the temperature of the belt holders 298 rises, the FP/UFP may be generated from a lubricant 180 adhering to the belt holders 298. Like the fixing devices described above, the drying device 206 according to the present embodiment prevents the temperature rise of the belt holders 298 and effectively reduces the generation of FP/UFP.

Figure 17:
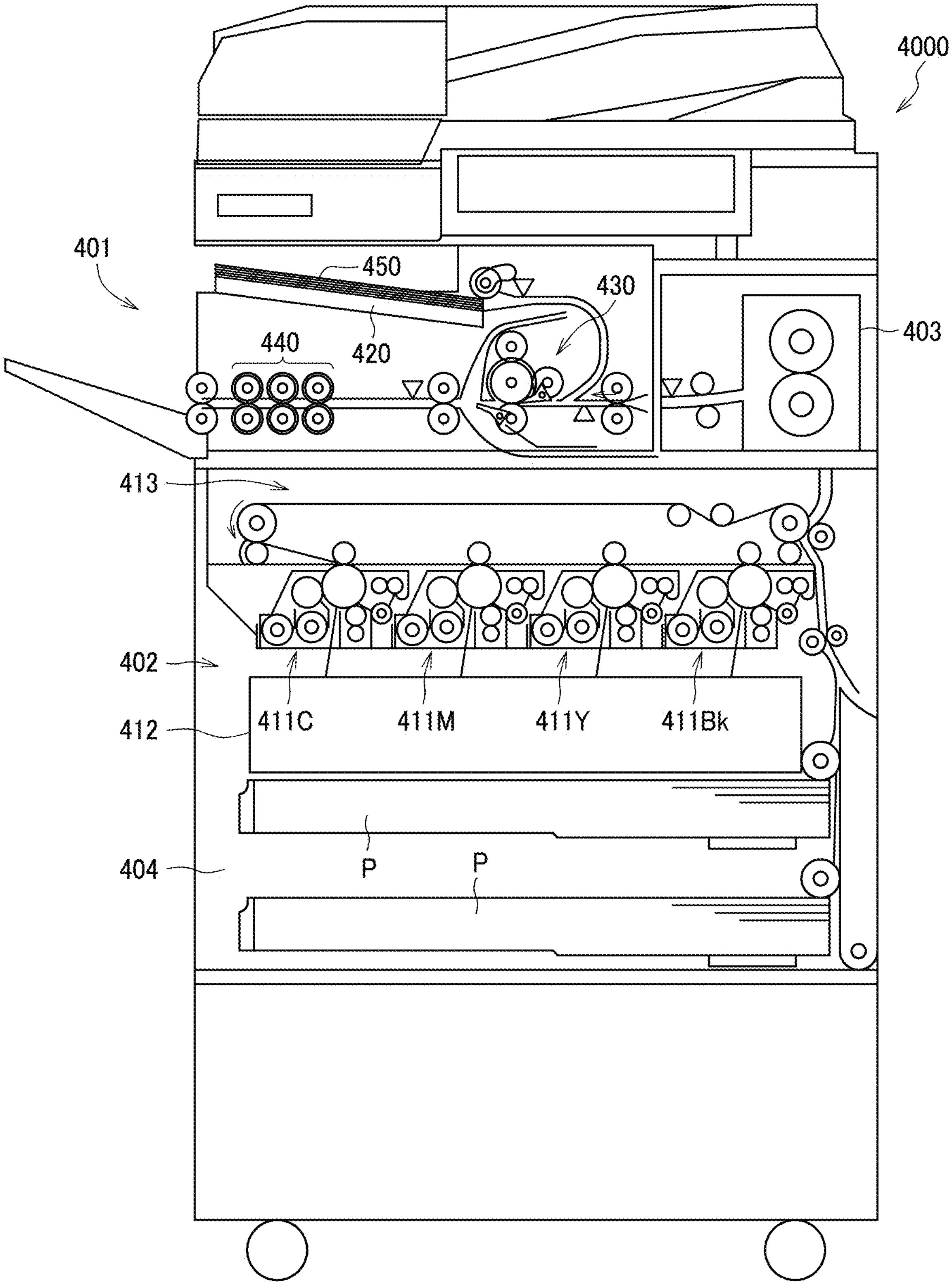
FIG. 17 is a diagram illustrating an image forming apparatus including a laminating device according to an embodiment of the present disclosure.

The embodiments of the present disclosure are also applicable to an image forming apparatus including a laminating device as illustrated in FIG. 17.

An image forming apparatus 4000 that is illustrated in FIG. 17 includes a laminating device 401, an image forming device 402, a fixing device 403, and a sheet feeding device 404 as a recording-medium supplier. The image forming device 402 includes a plurality of image forming units 411C, 411M, 411Y, and 411Bk, an exposure device 412, and a transfer device 413.

The laminating device 401 is a heating device that applies heat and pressure to two sheets between which a recording medium is inserted, to thermally press the sheets to the recording medium. Specifically, the laminating device 401 includes a sheet supplier 420, a sheet separator 430, and a thermal pressure rollers 440. The sheet supplier 420 supplies a sheet 450. The sheet separator 430 separates the sheet supplied from the sheet supplier 420 into two sheets. The thermal pressure rollers 440 as rotators convey the two separated sheets between which the recording medium is inserted, while applying heat and pressure to the sheets and the recording medium. The thermal pressure roller 440 is heated by a heating source such as a heater. Opposed longitudinal end portions of the thermal pressure roller 440 are rotatably held by a pair of rotator holders such as a pair of bearings.

In the image forming apparatus 4000 illustrated in FIG. 17, when a sheet P as a recording medium is supplied from the sheet feeding device 404 to the image forming device 402, the image forming device 402 forms an image and transfers the image onto the supplied sheet P. The sheet P bearing the transferred image is conveyed to the fixing device 403, which fixes the image onto the sheet P. The image forming and transfer processes performed by the image forming device 402 with the plurality of image forming units 411C, 411M, 411Y, and 411Bk, the exposure device 412, and the transfer device 413 are basically the same as those described in the above embodiment. The fixing process performed by the fixing device 403 is basically the same as that described in the above embodiment. Therefore, a redundant description thereof is omitted.

The sheet P subjected to the fixing process is then conveyed to the laminating device 401 and inserted between two sheets separated from each other. Then, the thermal pressure rollers 440 apply heat and pressure to the sheet P sandwiched between the two sheets to thermally press the sheets and the sheet P. The sheets and the sheet P thus thermally pressed are ejected to the outside of the image forming apparatus 4000.

When the thermal pressure roller 440 is heated by a heating source such as a heater and the temperature of the bearings supporting the thermal pressure roller 440 rises, the FP/UFP may be generated from a lubricant adhering to the bearings. Like the fixing devices and the drying device described above, the laminating device 401 including the thermal pressure rollers 440 according to the present embodiment prevents the temperature rise of the bearings that hold the thermal pressure rollers 440 and effectively reduces the generation of FP/UFP.

The embodiments described above are given by way of example, and unique advantageous effects are achieved for each of the following aspects given below.

According to a first aspect, a heating device includes a rotator, a heating source, a rotator holder, and a liquid or semi-solid substance. The rotator is rotatably held. The heating source heats the rotator. The rotator holder holds a longitudinal end portion of the rotator. The liquid or semi-solid substance has lubricity and adheres to the rotator holder. The rotator holder includes a reflector disposed at least at a portion to be irradiated with radiant heat emitted from the heating source to reflect the radiant heat. The reflector has a reflectance of not less than 60%.

According to a second aspect, in the heating device of the first aspect, the reflector has a reflectance of not less than 75%.

According to a third aspect, in the heating device of the first or second aspect, the rotator holder includes a base and a surface layer on a surface of the base. The surface layer includes the reflector.

According to a fourth aspect, in the heating device of the third aspect, the surface layer is made of a heat-resistant material.

According to a fifth aspect, in the heating device of the third or fourth aspect, the surface layer is a silver vapor deposition layer.

According to a sixth aspect, in the heating device of the third or fourth aspect, the surface layer is a film adhering to the base.

According to a seventh aspect, in the heating device of the third or fourth aspect, the surface layer is a paint layer.

According to an eighth aspect, in the heating device of any one of the first to seventh aspects, the rotator holder has a temperature of not greater than 210° C. during 10 minutes of continuous printing.

According to a ninth aspect, in the heating device of any one of the first to seventh aspects, the rotator holder has a temperature of not greater than 200° C. during 10 minutes of continuous printing.

According to a tenth aspect, in the heating device of any one of the first to seventh aspects, the rotator holder has a temperature of not greater than 194° C. during 10 minutes of continuous printing.

According to an eleventh aspect, in the heating device of any one of the first to seventh aspects, the rotator holder has a temperature of not greater than 185° C. during 10 minutes of continuous printing.

According to a twelfth aspect, a fixing device includes the heating device of any one of the first to eleventh aspects and a counter rotator that faces an outer circumferential surface of the rotator of the heating device, to heat a recording medium bearing an unfixed image and fix the unfixed image onto the recording medium.

According to a thirteenth aspect, an image forming apparatus includes the heating device of any one of the first to eleventh aspects or the fixing device of the twelfth aspect.

According to one aspect of the present disclosure, the generation of fine particles is reduced.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A heating device comprising:

a rotator in the form of an endless belt;

a heating source configured to heat the rotator from inside the rotator;

a pair of rotator holders, each rotator holder of the pair of rotator holders having a C-shaped cross-section and configured to be inserted into opposed longitudinal end portions of the rotator to rotatably hold the rotator from inside the rotator, the pair of rotator holders including a reflector on at least at a portion of an inner circumferential face of the pair of rotator holders, the inner circumferential face facing the heating source and configured to be irradiated with radiant heat emitted from the heating source to reflect the radiant heat, the reflector having a reflectance of not less than 60%; and a substance having lubricity between the rotator and the pair of rotator holders.

2. The heating device according to claim 1, wherein the reflector has a reflectance of not less than 75%.

3. The heating device according to claim 1, wherein each rotator holder of the pair of rotator holders includes:

a base; and a surface layer on a surface of the base, the surface layer including the reflector.

4. The heating device according to claim 3, wherein the surface layer is made of a heat-resistant material.

5. The heating device according to claim 3, wherein the surface layer is a silver vapor deposition layer.

6. The heating device according to claim 3, wherein the surface layer is a film adhering to the base.

7. The heating device according to claim 3, wherein the surface layer is a paint layer.

8. The heating device according to claim 1, wherein the pair of rotator holders has a temperature of not greater than 210° C. during 10 minutes of continuous printing.

9. The heating device according to claim 1, wherein the pair of rotator holders has a temperature of not greater than 200° C. during 10 minutes of continuous printing.

10. The heating device according to claim 1, wherein the pair of rotator holders has a temperature of not greater than 194° C. during 10 minutes of continuous printing.

11. The heating device according to claim 1, wherein the pair of rotator holders has a temperature of not greater than 185° C. during 10 minutes of continuous printing.

12. A fixing device comprising:

the heating device according to claim 1, configured to heat a recording medium bearing an unfixed image; and a counter rotator facing an outer circumferential surface of the rotator of the heating device to fix the unfixed image onto the recording medium.

13. An image forming apparatus comprising the fixing device according to claim 12.

14. An image forming apparatus comprising the heating device according to claim 1.

15. The heating device according to claim 1, wherein the pair of rotator holders include a restraint having an outer diameter greater than an outer diameter of a portion inserted into the longitudinal end portion of the rotator.

* * * * *